United States Patent
Choi et al.

(10) Patent No.: US 11,167,784 B2
(45) Date of Patent: Nov. 9, 2021

(54) HANDLE-TYPE INTEGRATED CONTROL DEVICE FOR VEHICLES

(71) Applicants: HYUNDAI MOTOR COMPANY, Seoul (KR); KIA MOTORS CORPORATION, Seoul (KR); SL Corporation, Daegu (KR)

(72) Inventors: Jee Hyuck Choi, Hwaseong-si (KR); Gi Man Park, Daegu (KR); Hong Jun Cha, Daegu (KR)

(73) Assignees: Hyundai Motor Company, Seoul (KR); Kia Motors Corporation, Seoul (KR); SL Corporation, Daegu (KR)

( * ) Notice: Subject to any disclaimer, the term of this patent is extended or adjusted under 35 U.S.C. 154(b) by 0 days.

(21) Appl. No.: 16/989,106

(22) Filed: Aug. 10, 2020

(65) Prior Publication Data

US 2021/0221422 A1 Jul. 22, 2021

(30) Foreign Application Priority Data

Jan. 17, 2020 (KR) .................. 10-2020-0006669

(51) Int. Cl.
*B62D 1/12* (2006.01)
*B60K 26/02* (2006.01)
(Continued)

(52) U.S. Cl.
CPC ............. *B62D 1/12* (2013.01); *B60K 26/02* (2013.01); *G05G 1/04* (2013.01); *G05G 5/03* (2013.01); *G05G 5/05* (2013.01); *G05G 9/047* (2013.01); *B60K 2026/029* (2013.01); *B60T 7/08* (2013.01); *G05G 2009/0474* (2013.01);
(Continued)

(58) Field of Classification Search
CPC .. G05G 1/04; G05G 1/06; G05G 5/03; G05G 5/05; G05G 9/047; G05G 2009/0474; G05G 2009/04721; G05G 2009/04766; G05G 2505/00; B60T 7/08; B60T 7/102; B62D 1/12; B62D 5/005; B60K 26/02; B60K 2026/029
See application file for complete search history.

(56) References Cited

U.S. PATENT DOCUMENTS

| | | | | |
|---|---|---|---|---|
| 10,088,915 B2 * | 10/2018 | Drum | ..................... | G05G 9/047 |
| 10,099,664 B2 * | 10/2018 | Levich | ..................... | G05G 1/04 |
| 2008/0278448 A1 * | 11/2008 | Nilsagard | ............. | G05G 9/053 345/161 |

FOREIGN PATENT DOCUMENTS

| | | | | |
|---|---|---|---|---|
| DE | 2123438 A1 * | 11/1971 | ............... | G01S 7/02 |
| GB | 2264771 A * | 9/1993 | ............... | G05G 9/04 |

(Continued)

*Primary Examiner* — Adam D Rogers
(74) *Attorney, Agent, or Firm* — Morgan, Lewis & Bockius LLP

(57) ABSTRACT

A handle-type integrated control device includes: a steering lever disposed to be movable in a width direction of a vehicle by a driver's operation; a handle housing disposed at an upper end of the steering lever and configured to rotate, in a front-to-rear direction of the vehicle, about one end of the steering lever by the driver's operation; a speed value receiver disposed at one end of the handle housing to receive an acceleration or deceleration change value; and a speed controller connected to the speed value receiver to receive the acceleration or deceleration change value from the speed value receiver.

10 Claims, 7 Drawing Sheets

(51) Int. Cl.
    *G05G 9/04*           (2006.01)
    *G05G 1/04*           (2006.01)
    *B60T 7/08*            (2006.01)
    *G05G 9/047*         (2006.01)
    *G05G 5/05*           (2006.01)
    *G05G 5/03*           (2008.04)

(52) U.S. Cl.
    CPC ............ *G05G 2009/04766* (2013.01); *G05G 2505/00* (2013.01)

(56) References Cited

FOREIGN PATENT DOCUMENTS

| | | | |
|---|---|---|---|
| KR | 10-2016-0057858 A | 5/2016 | |
| WO | WO-2019134735 A1 * | 7/2019 | ............ E02F 9/2004 |

* cited by examiner

[FIG. 1]

[FIG. 3A]
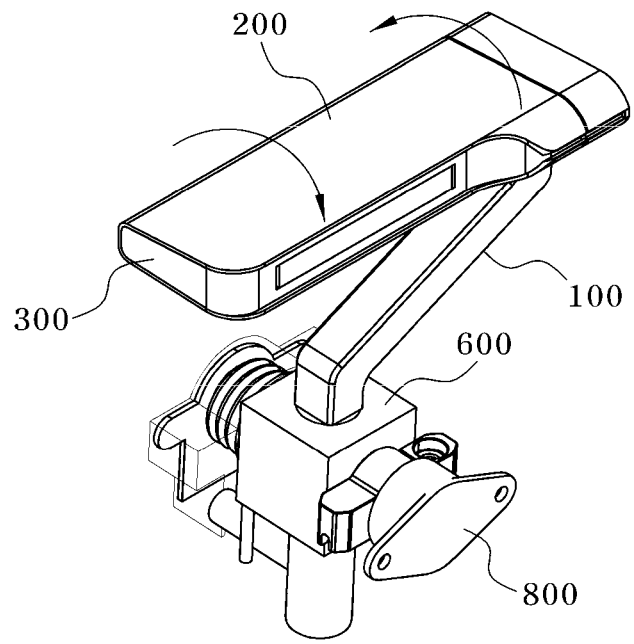
[FIG. 3B]
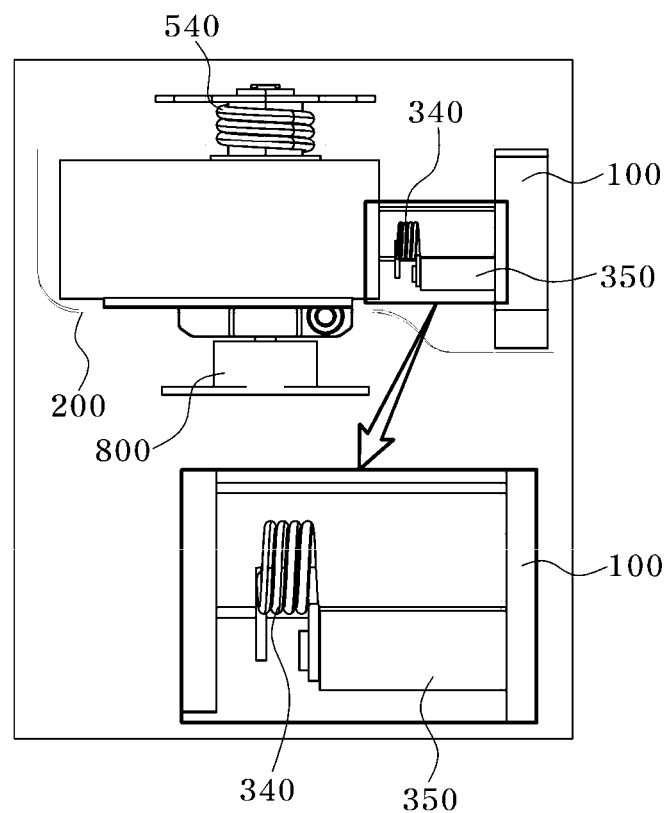

[FIG. 4]
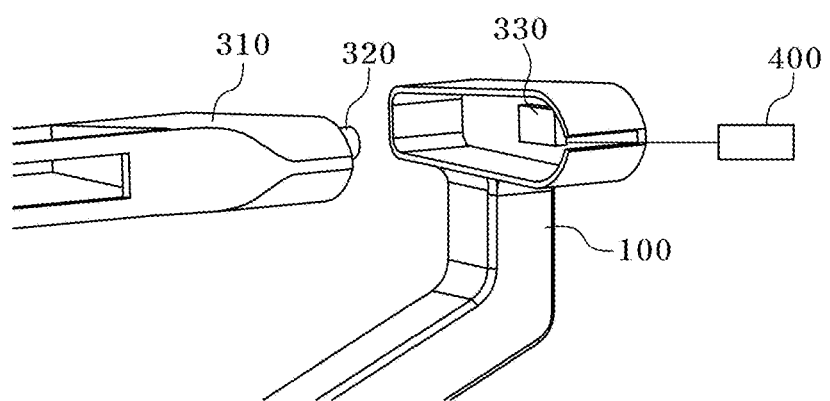

[FIG. 5]
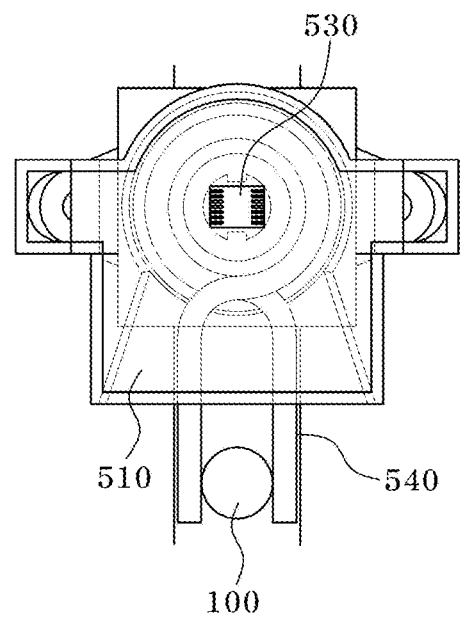

[FIG. 7]
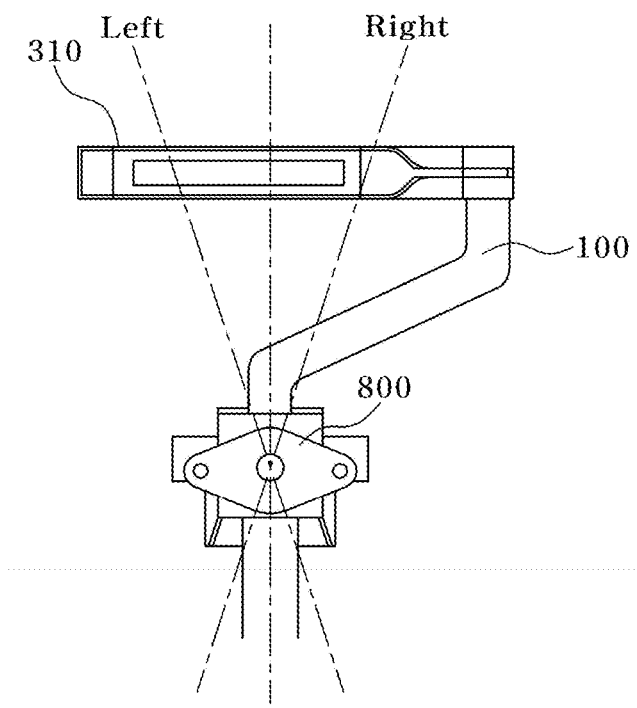

HANDLE-TYPE INTEGRATED CONTROL DEVICE FOR VEHICLES

CROSS-REFERENCE TO RELATED APPLICATION

This application claims the benefit of priority to Korean Patent Application No. 10-2020-0006669 filed on Jan. 17, 2020 in the Korean Intellectual Property Office, the entire contents of which are incorporated herein by reference.

BACKGROUND

The present disclosure relates to a handle-type integrated control device for vehicles, and more particularly, to a handle-type integrated control device for vehicles, which is equipped with a system capable of integrally controlling acceleration, deceleration, steering, and shifting of a vehicle with a single handle.

TECHNICAL FIELD

A variety of functions are typically required to control a vehicle, such as steering control for controlling the direction of the vehicle, acceleration control for controlling the acceleration of the vehicle, braking control for controlling the deceleration of the vehicle, and shift control for controlling the speed of the vehicle.

A vehicle is generally equipped with a steering wheel for steering control, an accelerator pedal for acceleration control, a brake pedal for braking control, and a shift lever for shifting control so that a driver is able to control the vehicle.

The above-described driving control devices however reduce the interior space of the vehicle and restrict the utilization of the interior space because separate components for performing the functions of the respective driving control devices are further required. In addition, the mounting of the multiple components brings about an increase in weight and cost of the vehicle.

In particular, the shift lever is commonly exposed to the interior of the vehicle through an upper surface of a console between a driver's seat and a passenger seat. Hence, the shift lever, which is always exposed to the interior, causes inconvenience to the passenger moving between the drivers seat and the passenger seat.

In addition, it is impossible, around the shift lever, to increase a storage space such as a cup holder or a console box and to arrange operation buttons for operating various convenience devices.

With the development of autonomous driving technology in recent years, a large number of components required to drive a vehicle have been automated and a driver's direct control area is decreasing accordingly. Due to this development of technology, the interior of the vehicle is being reduced to an existing role of space for controlling the vehicle and is evolving into space for rest and leisure during the driving of the vehicle.

Due to this trend, it is necessary to develop a device capable of integrating separate components mounted for vehicle control to increase utilization of interior space and reduce cost/weight.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

The present disclosure has been made in an effort to solve the above-described problems associated with prior art.

In one aspect, the present disclosure provides a handle-type integrated control device for vehicles, which is equipped with an integrated system for steering control, acceleration control, deceleration control, and shifting control.

In another aspect, the present disclosure provides a handle-type integrated control device for vehicles, which includes a speed value receiver and a speed controller, which are operatively connected to each other, and a steering unit and a steering controller which are operatively connected to each other.

The present disclosure is not limited to the above-mentioned aspects, and other aspects and advantages of the present disclosure can be understood by the following description and become apparent with reference to the embodiments of the present disclosure. It is obvious to those skilled in the art to which the present disclosure pertains that the aspects and advantages of the present disclosure can be realized by the means as claimed and combinations thereof.

The above and other aspects can be accomplished by the provision of a handle-type integrated control device for vehicles.

According to an exemplary embodiment of the present disclosure, a handle-type integrated control device for vehicles includes: a steering lever disposed to be movable in a width direction of a vehicle by a driver's operation; a handle housing disposed at an upper end of the steering lever and configured to rotate, in a front-to-rear direction of the vehicle, about one end of the steering lever by the driver's operation; a speed value receiver disposed at one end of the handle housing to receive an acceleration or deceleration change value; and a speed controller connected to the speed value receiver to receive the acceleration or deceleration change value from the speed value receiver.

The handle-type integrated control device may further include a steering unit fixed to the steering lever to receive a steering change value, a hinge housing positioned at a lower end of the handle housing to fix the steering lever, and a steering controller connected to the steering unit to receive the steering change value from the steering unit.

The speed value receiver may include a handle configured to rotate in response to the rotation of the handle housing, a speed magnet fixed to one end of a central shaft of the handle to rotate integrally with the handle, and a speed sensor spaced apart from the speed magnet by a predetermined distance and fixed to one end of the steering lever.

The speed sensor may measure an amount of rotation of the speed magnet and transmit the measured amount of rotation to the speed controller, thereby enabling the vehicle to accelerate or decelerate.

The handle-type integrated control device may further include a return spring positioned at one end of the handle, and a handle connector formed at one end of the steering lever while having a hole for insertion of the central shaft of the handle, the handle connector being configured to connect the handle to the steering lever.

The handle may be rotated by a predetermined angle, and the return spring may apply an elastic restoring force to the handle.

The steering unit may include a steering hinge fixed to the steering lever and having a hinge about which the steering lever rotates, a steering magnet fixed to a central shaft of the steering hinge to rotate integrally with the steering lever, and a steering sensor spaced apart from the steering magnet by a predetermined distance and fixed to the steering hinge.

The steering sensor may measure an amount of rotation of the steering magnet and transmit the measured amount of rotation to the steering controller, thereby enabling the vehicle to steer.

The handle-type integrated control device may further include a torsion spring positioned at one end of the steering hinge.

The steering lever may be rotated by a predetermined angle, and the torsion spring may apply an elastic restoring force to the steering lever.

The handle-type integrated control device may further include a damper positioned adjacent to the steering unit in the hinge housing and configured to generate a reaction force against the rotation of the steering lever.

Other aspects and embodiments of the disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the disclosure are discussed infra.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein:

FIGS. 3A and 3B are views illustrating a state of change in acceleration and deceleration in a handle-type integrated control device for vehicles according to an exemplary embodiment of the present disclosure;

FIG. 4 is a view illustrating a driving principle of a speed value receiver of a handle-type integrated control device for vehicles according to an exemplary embodiment of the present disclosure;

FIG. 5 is a view illustrating a steering unit of a handle-type integrated control device for vehicles according to an exemplary embodiment of the present disclosure;

FIG. 7 is a view illustrating a state of operation of steering functions in a handle-type integrated control device for vehicles according to an exemplary embodiment of the present disclosure.

Figure 1:
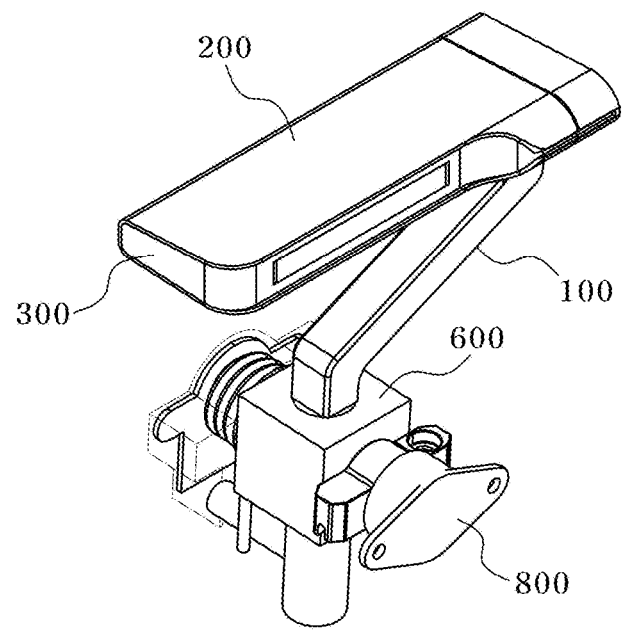
FIG. 1 is a perspective view illustrating a handle-type integrated control device for vehicles according to an exemplary embodiment of the present disclosure.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

In addition, the term "part", "unit", or the like used herein refer to a unit for processing at least one function or operation, which may be implemented by hardware or software, or in combination thereof.

In addition, the terms "width direction" and/or "longitudinal direction" used herein refers to directions indicated based on a vehicle.

In addition, it will be understood that when an element is referred to as being "above" or "on" another element, it can be "immediately above" the other element or intervening elements may also be present. In contrast, it will be understood that when an element is referred to as being "beneath" or "under" another element, it can be "immediately beneath" the other element or intervening elements may also be present.

In addition, the terms "clockwise direction" and/or "counterclockwise direction" used herein refers to directions indicated based on a vehicle.

Figure 2:
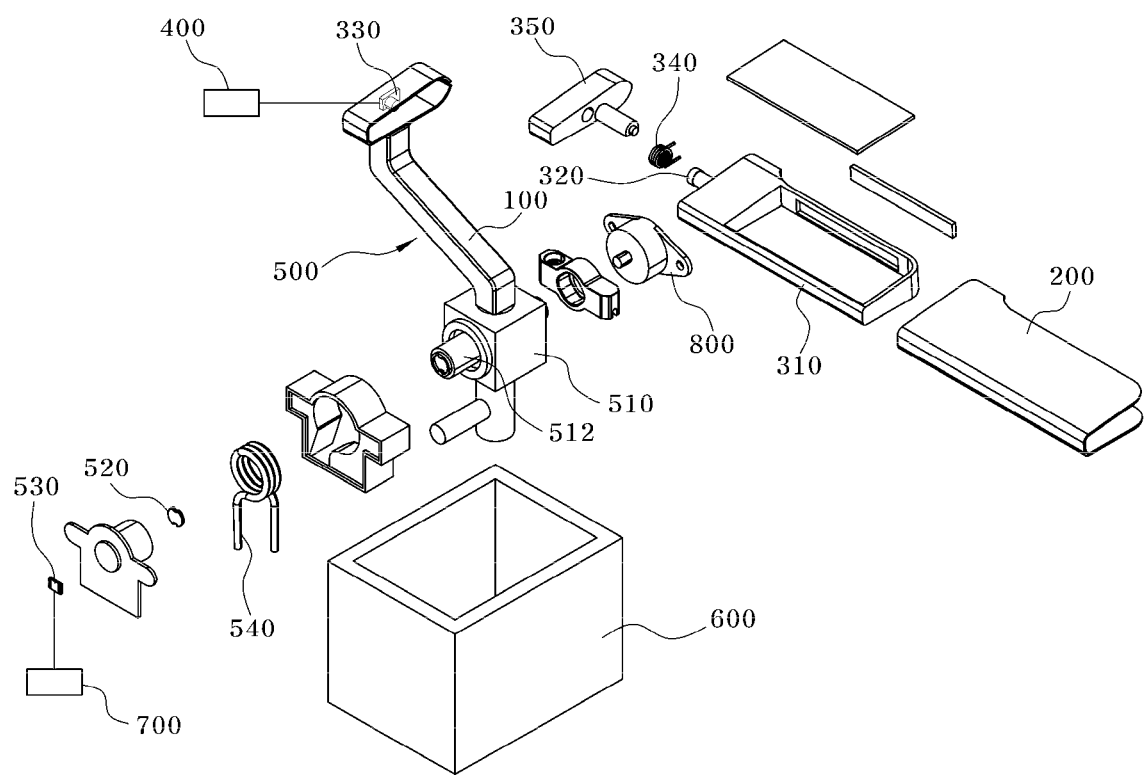
FIG. 2 is a view illustrating a configuration of a handle-type integrated control device for vehicles according to an exemplary embodiment of the present disclosure.

FIG. 1 is a perspective view illustrating a handle-type integrated control device for vehicles according to an exemplary embodiment of the present disclosure. FIG. 2 is a view illustrating a configuration of a handle-type integrated control device for vehicles according to an exemplary embodiment of the present disclosure.

Referring to FIGS. 1 and 2, a handle-type integrated control device for vehicles according to an exemplary embodiment of the present disclosure includes a steering lever 100 displaced in a width direction of a vehicle by a driver's operation, a handle housing 200 positioned at the upper end of the steering lever 100 to rotate in a front-to-rear direction of the vehicle about one end of the steering lever 100 by the driver's operation, a speed value receiver 300 positioned at one end of the handle housing 200 to receive an acceleration or deceleration change value, and a speed controller 400 connected to the speed value receiver 300 to receive the acceleration or deceleration change value from the speed value receiver 300.

The handle-type integrated control device may further include a steering unit 500 fixed to the steering lever 100 to receive a steering change value, a hinge housing 600 positioned at the lower end of the handle housing 200 to fix the steering lever 100, and a steering controller 700 connected to the steering unit 500 to receive the steering change value from the steering unit 500.

The steering lever 100 may be displaced in the width direction of the vehicle by the driver's operation. The steering lever 100 may have a shape bent to one side in the width direction.

The handle housing 200 may be positioned at the upper end of the steering lever 100. The handle housing 200 may be wider in the width direction at one end of the upper portion of the steering lever 100. The handle housing 200 may rotate in the front-to-rear direction of the vehicle about one end of the steering lever 100 by the driver's operation. The handle housing 200 may be in contact with a driver's hand to control deceleration when it is rotated forward and to control acceleration when it is rotated rearward.

In addition, when the driver grips the handle housing 200 to operate in the width direction, the steering lever 100 may be displaced in the width direction.

The speed value receiver 300 may be positioned at one end of the handle housing 200 to receive the acceleration or deceleration change value. More specifically, when the driver rotates a handle 310 in the front-to-rear direction to input an acceleration or deceleration change value, the speed value receiver 300 may be receive the acceleration or deceleration change value. The speed value receiver 300 may include a handle 310, a speed magnet 320, and a speed sensor 330.

The handle 310 may rotate in response to the rotation of the handle housing 200. The handle 310 may be formed inside the handle housing 200 and have a central shaft formed at one end thereof. The speed value receiver 300 may control the acceleration and deceleration of the vehicle while the handle 310 is rotated about the central shaft, formed at one end thereof, by the driver's operation.

The speed magnet 320 may be fixed to one end of the central shaft of the handle 310 to rotate integrally with the handle 310. The speed magnet 320 may have a size corresponding to a cylindrical cross-section at one end of the handle 310. The speed magnet 320 may rotate along with the rotation of the handle 310 in the front-to-rear direction thereof.

The speed sensor 330 may be spaced apart from the speed magnet 320 by a predetermined distance and be fixed to one end of the steering lever 100. The speed sensor 330 capable of detecting a magnetic force may be disposed on a circuit board spaced apart from the speed magnet 320 by a predetermined distance. The speed sensor 330 may include a Hall sensor using magnets.

The speed sensor 330 may convert a magnetic force into an electrical signal. The position of the speed magnet 320 may be measured by means of the electrical signal, mainly the voltage, detected by the speed sensor 330.

The speed controller 400 may be connected to the speed value receiver 300 to receive the acceleration or deceleration change value from the speed value receiver 300. More specifically, the speed controller 400 may be connected to the speed sensor 330 to receive information on an amount of rotation of the speed magnet 320 detected by the speed sensor 330.

The speed controller 400 may communicate with an engine controller of the vehicle to control the acceleration and deceleration of the vehicle by adjusting a speed of an engine (engine RPM), an opening amount of a throttle valve, and the like based on the received information. A hybrid vehicle may be decelerated by a motor, a friction brake, an engine RPM, or the like, and an internal combustion engine vehicle may be decelerated by an engine RPM, a friction brake, or the like.

The steering unit 500 may be fixed to the steering lever 100 to receive the steering change value. When the driver displaces the steering lever 100 in the width direction to input a steering change value, the steering unit 500 may receive the steering change value. For example, when a steering change value is input to steer toward a right side of the driver's seat, a steering wheel may be driven to move rightward. On the other hand, when a steering change value is input to steer toward a left side of the driver's seat, the steering wheel may be driven to move leftward.

The hinge housing 600 may be positioned at the lower end of the handle housing 200 to fix the steering lever 100. The hinge housing 600 may be configured such that the upper end thereof is displaced in the width direction in the state in which the lower end of the steering lever 100 is fixed to the hinge housing 600.

The steering controller 700 may be connected to the steering unit 500 to receive the steering change value from the steering unit 500. The steering controller 700 may be connected to a steering sensor 530 to receive information on an amount of rotation of a steering magnet 520 detected by the steering sensor 530.

Furthermore, the handle-type integrated control device for vehicles according to an exemplary embodiment of the present disclosure may perform compensation in response to the driving state of the vehicle when the driver further inputs a steering change value with the acceleration or deceleration change value input. Specifically, when a steering change value is input while the vehicle is accelerating or traveling at a certain speed or more, negative compensation may be performed to prevent a steering angle from changing suddenly. On the other hand, when a steering change value is input while the vehicle is decelerating or traveling at a certain speed or less, positive compensation may be performed to easily provide a radius of rotation.

FIGS. 3A and 3B are views illustrating a state of change in acceleration and deceleration in a handle-type integrated control device for vehicles according to an exemplary embodiment of the present disclosure.

Referring to FIGS. 3A and 3B, the handle-type integrated control device for vehicles according to an exemplary embodiment of the present disclosure may further include a return spring 340 positioned at one end of the handle 310. In addition, the handle-type integrated control device may further include a handle connector 350 formed at one end of the steering lever 100 while having a hole for insertion of the central shaft of the handle 310 and configured to connect the handle 310 to the steering lever 100. The handle 310 may be rotated by a predetermined angle and the return spring 340 may apply an elastic restoring force to the handle 310.

The return spring 340 may be positioned at one end of the handle 310. The handle connector 350 may be configured such that one end thereof is connected to the steering lever 100 and the other end thereof is connected to the central shaft of the handle 310. The hole of the handle connector 350 may correspond to the shape of the central shaft of the handle 310.

One end of the return spring 340 may be supported by the handle connector 350 and the other end thereof may be supported by the handle housing 200. When the handle 310 is rotated in the front-to-rear direction, the return spring 340 may apply an elastic restoring force to the handle part 310.

When the handle 310 is rotated forward, the handle 310 may be rotated rearward and restored by the elastic force of the return spring 340. On the other hand, when the handle 310 is rotated rearward, the handle 310 may be rotated forward and restored by the elastic force of the return spring 340.

FIG. 4 is a view illustrating a driving principle of a speed value receiver of a handle-type integrated control device for vehicles according to an exemplary embodiment of the present disclosure.

Referring to FIG. 4, the speed sensor 330 measures the amount of rotation of the speed magnet 320 and transmits it to the speed controller 400, which enables the vehicle to accelerate or decelerate.

The speed sensor 330 may be spaced apart from the speed magnet 320 by a predetermined distance and may measure the amount of rotation of the speed magnet 320. A magnetic force is generated when the speed magnet 320 rotates, in which case the speed sensor 330 may convert the magnetic force into an electrical signal. Alternatively, the speed sensor 330 may detect a voltage to measure the amount of rotation of the speed magnet 320.

The information on the amount of rotation of the speed magnet 320 measured by the speed sensor 330 may be transmitted to the speed controller 400. The speed controller 400 connected to the speed sensor 330 may cause the vehicle to accelerate or decelerate by receiving the information on the amount of rotation of the speed magnet 320.

In an exemplary embodiment of the present disclosure, the vehicle may be decelerated when the handle 310 rotates forward while the vehicle is traveling forward, and the vehicle may be reversed when the handle 310 rotates forward in the state in which the vehicle stops. On the other hand, the vehicle may be accelerated when the handle 310 rotates rearward. Thus, rotating the handle 310 may perform the acceleration/deceleration of as well as the shifting of the vehicle.

Figure 6A:
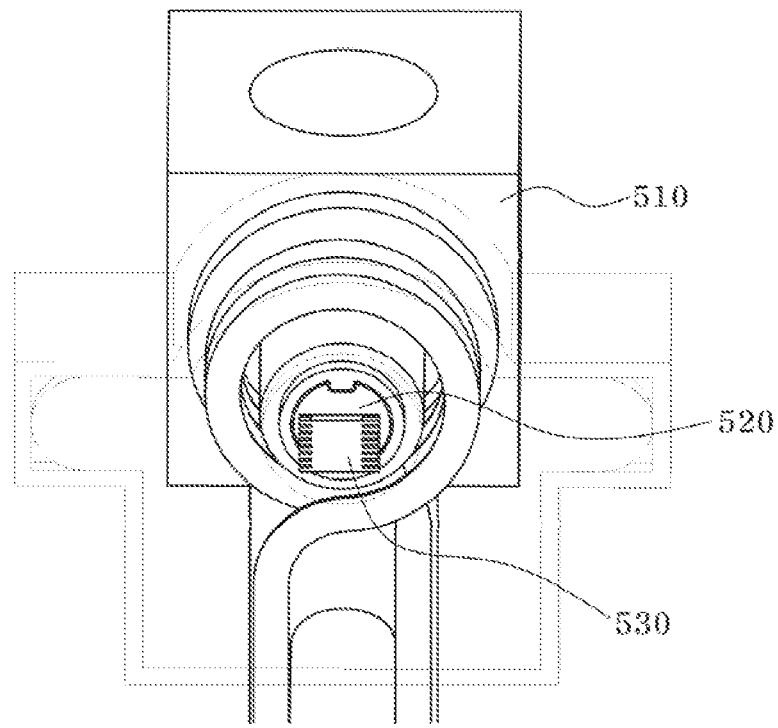
FIGS. 6A and 6B are views illustrating a driving principle of a steering unit of a handle-type integrated control device for vehicles according to an exemplary embodiment of the present disclosure.
Figure 6B:
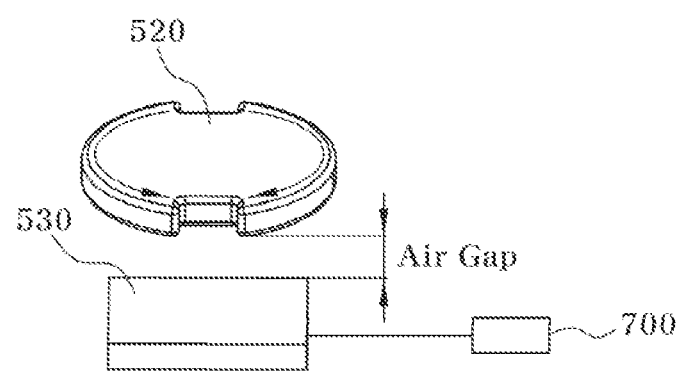

FIG. 5 is a view illustrating a steering unit of a handle-type integrated control device for vehicles according to an exemplary embodiment of the present disclosure. FIGS. 6A and 6B are views illustrating a driving principle of a steering unit of a handle-type integrated control device for vehicles according to an exemplary embodiment of the present disclosure.

Referring to FIGS. 5, 6A and 6B, the steering unit 500 of the handle-type integrated control device for vehicles according to an exemplary embodiment of the present disclosure may include a steering hinge 510, a steering magnet 520, and a steering sensor 530. The steering unit 500 may further include a torsion spring 540 positioned at one end of the steering hinge 510.

The steering hinge 510 may be fixed to the steering lever 100 and have a central shaft about which the steering lever 100 rotates. The torsion spring 540 may be fixed to one end of the steering hinge 510.

The steering lever 100 may have a protrusion formed longitudinally at one end thereof. One end of the torsion spring 540 may be in contact with the protrusion of the steering lever 100, and the other end thereof may be fixed to the steering hinge 510. The torsion spring 540 may be positioned coaxially with the steering lever 100 to apply an elastic restoring force to the steering lever 100.

In an exemplary embodiment of the present disclosure, when the steering lever 100 is rotated clockwise, the steering lever 100 may be rotated counterclockwise and restored by the elastic force of the torsion spring 540. On the other hand, when the steering lever 100 is rotated counterclockwise, the steering lever 100 may be rotated clockwise and restored by the elastic force of the torsion spring 540.

The steering magnet 520 may be fixed to a central shaft 512 of the steering hinge 510 to rotate integrally with the steering lever 100. The steering sensor 530 may be spaced apart from the steering magnet 520 by a predetermined distance and be fixed to the steering hinge 510. The steering sensor 530 measures an amount of rotation of the steering magnet 520 and transmits it to the steering controller 700, which enables the vehicle to steer.

The steering sensor 530 may be spaced apart from the steering magnet 520 by a predetermined distance and be fixed to the central shaft 512 of the steering hinge 510. The steering sensor 530 capable of detecting a magnetic force may be disposed on a circuit board spaced apart from the steering magnet 520 by a predetermined distance. The steering sensor 530 may be a Hall sensor using magnets.

The steering sensor 530 may convert a magnetic force into an electrical signal. The position of the steering magnet 520 may be measured by means of the electrical signal, mainly the voltage, detected by the steering sensor 530.

The steering sensor 530 may be spaced apart from the steering magnet 520 by a predetermined distance and may measure the amount of rotation of the steering magnet 520. A magnetic force is generated when the steering magnet 520 rotates, in which case the steering sensor 530 may convert the magnetic force into an electrical signal. The steering sensor 530 may detect a voltage to measure the amount of rotation of the steering magnet 520.

The information on the amount of rotation of the steering magnet 520 measured by the steering sensor 530 may be transmitted to the steering controller 700. The steering controller 700 connected to the steering sensor 530 may cause the vehicle to steer by receiving the information on the amount of rotation of the steering magnet 520.

FIG. 7 is a view illustrating a state of operation of steering functions in a handle-type integrated control device for vehicles according to an exemplary embodiment of the present disclosure.

Referring to FIG. 7, in the handle-type integrated control device for vehicles according to an exemplary embodiment of the present disclosure, the steering lever 100 may be rotated by a predetermined angle and the torsion spring 540 may apply an elastic restoring force to the steering lever 100. The handle-type integrated control device may further include a damper 800 positioned adjacent to the steering unit 500 in the hinge housing 600 and configured to generate a reaction force against the rotation of the steering lever 100.

The steering lever 100 may be rotated in the width direction of the vehicle by a predetermined angle. When the driver operates the handle housing 200 to rotate the steering lever 100 clockwise by a predetermined angle, the vehicle may be steered to the right. On the other hand, when the driver operates the handle housing 200 to rotate the steering lever 100 counterclockwise by a predetermined angle, the vehicle may be steered to the left.

When the steering lever 100 is rotated clockwise by a predetermined angle, the steering lever 100 may be rotated counterclockwise by the predetermined angle and restored by the elastic force of the torsion spring 540. On the other hand, when the steering lever 100 is rotated counterclockwise by a predetermined angle, the steering lever 100 may be rotated clockwise by the predetermined angle and restored by the elastic force of the torsion spring 540.

The damper 800 may be positioned adjacent to the steering unit 500 in the hinge housing 600. The damper 800 may generate the reaction force against the rotation of the steering lever 100. More specifically, the damper 800 may be positioned on the back surface of the steering hinge 510 and connected to the central shaft 512 of the steering hinge 510, thereby preventing the steering lever 100 from rotating suddenly.

In an exemplary embodiment of the present disclosure, the damper 800 may include a cylinder container filled with silicon oil and a rotary shaft having a rotor with blades, which may create rotation. When the rotor rotates, the silicone oil may generate resistance against the rotation of the rotor to generate torque in a direction opposite to the direction of rotation of the rotor. Due to the opposite torque of the silicone oil, the sudden rotation of the steering lever 100 may be restricted. Although the damper 800 of the present disclosure is described as using fluid such as the silicon oil, the present disclosure is not limited thereto. For example, a damper using a friction plate or an electromagnetic force may also be applied to the present disclosure.

In summary, the handle-type integrated control device for vehicles is equipped with the integrated system for steering control, acceleration control, deceleration control, and shifting control. Therefore, it is possible to reduce the number of separate components for individual controls to maximize the utilization of the interior space and to reduce the weight of the vehicle.

As is apparent from the above description, the present disclosure can obtain the following effects by the configuration, combination, and relationship of the components described in the exemplary embodiments.

The handle-type integrated control device for vehicles is equipped with the integrated system for steering control, acceleration control, deceleration control, and shifting control. Therefore, it is possible to reduce the number of separate components for individual controls to maximize the utilization of the interior space and to reduce the weight of the vehicle.

In addition, the handle-type integrated control device for vehicles includes the speed value receiver and the speed controller, which are operatively connected to each other, and the steering unit and the steering controller which are operatively connected to each other. Therefore, it is possible to control acceleration/deceleration and steering by operating the single handle and adjusting the direction of the lever.

The above detailed description is illustrative of the disclosure. In addition, the above description is intended to illustrate and explain the exemplary embodiments of the present disclosure, and the present disclosure may be used in various other combinations, modifications, and environments. That is, it is possible to make changes or modifications within the scope of the concept of the disclosure disclosed herein, within the scope of the disclosure, and/or within the skill and knowledge of the art. The described embodiments are intended to illustrate the best mode for carrying out the technical idea of the present disclosure and various changes may be made in the specific applications and uses of the present disclosure. Accordingly, the detailed description of the disclosure is not intended to limit the disclosure to the disclosed embodiments. It is also to be understood that the appended claims are intended to cover such other embodiments.

What is claimed is:

1. A handle-type integrated control device, comprising:
   a steering lever disposed to be movable in a width direction of a vehicle by a driver's operation;
   a handle housing disposed at an upper end of the steering lever and configured to rotate in a front-to-rear direction of the vehicle about the upper end of the steering lever by the driver's operation;
   a speed value receiver disposed at one end of the handle housing to receive an acceleration or deceleration change value;
   a speed controller connected to the speed value receiver to receive the acceleration or deceleration change value from the speed value receiver;
   a steering unit fixedly attached to the steering lever and configured to receive a steering change value;
   a hinge housing disposed at a lower end of the handle housing and configured to support the steering lever; and
   a steering controller connected to the steering unit and configured to receive the steering change value from the steering unit.

2. The handle-type integrated control device of claim 1, wherein the speed value receiver comprises:
   a handle configured to rotate in response to rotation of the handle housing;
   a speed magnet fixed to one end of a central shaft of the handle to rotate integrally with the handle; and
   a speed sensor spaced apart from the speed magnet by a predetermined distance and fixed to the upper end of the steering lever.

3. The handle-type integrated control device of claim 2, wherein the speed sensor measures an amount of rotation of the speed magnet and transmits the measured amount of rotation to the speed controller for vehicle acceleration or deceleration.

4. The handle-type integrated control device of claim 2, further comprising:
   a return spring disposed at one end of the handle; and
   a handle connector formed at the upper end of the steering lever while having a hole for insertion of the central shaft of the handle, the handle connector being configured to connect the handle to the steering lever.

5. The handle-type integrated control device of claim 4, wherein the handle is configured to rotate by a predetermined angle, and
   wherein the return spring is configured to apply an elastic restoring force to the handle when the handle is rotated.

6. The handle-type integrated control device of claim 1, wherein the steering unit comprises:
   a steering hinge fixed to the steering lever, wherein the steering hinge has a central shaft therein such that the steering lever rotates about the central shaft;
   a steering magnet fixed to the central shaft of the steering hinge to rotate integrally with the steering lever; and
   a steering sensor spaced apart from the steering magnet by a predetermined distance and fixed to the steering hinge.

7. The handle-type integrated control device of claim 6, wherein the steering sensor measures an amount of rotation of the steering magnet and transmits the measured amount of rotation to the steering controller for steering the vehicle.

8. The handle-type integrated control device of claim 6, further comprising a torsion spring positioned at one end of the steering hinge.

9. The handle-type integrated control device of claim 8, wherein the steering lever is configure to rotate by a predetermined angle, and
   wherein the torsion spring is configured to apply an elastic restoring force to the steering lever when the steering lever is rotated.

10. The handle-type integrated control device of claim 1, further comprising a damper disposed adjacent to the steering unit in the hinge housing and configured to generate a reaction force against rotation of the steering lever.

* * * * *